April 24, 1962   R. E. SCHWARTZ   3,031,235
APPLICATION VALVE
Original Filed Sept. 5, 1958        2 Sheets-Sheet 1
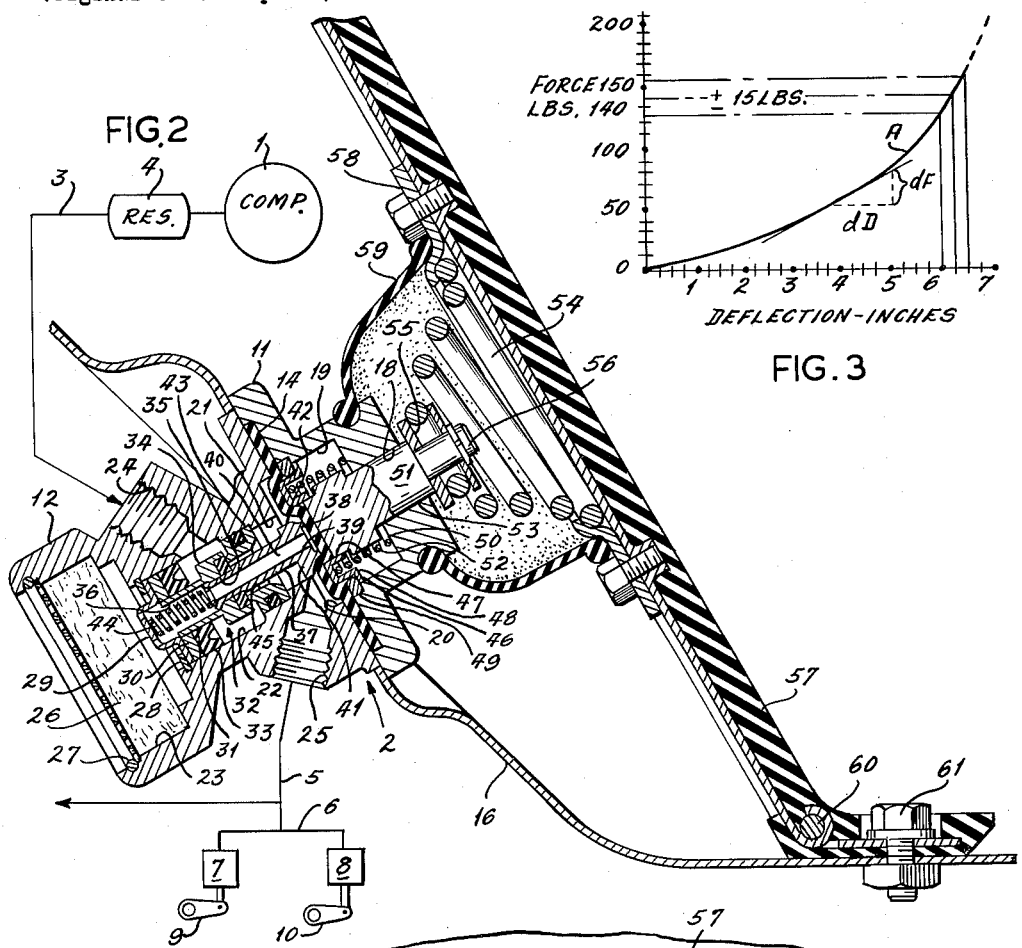
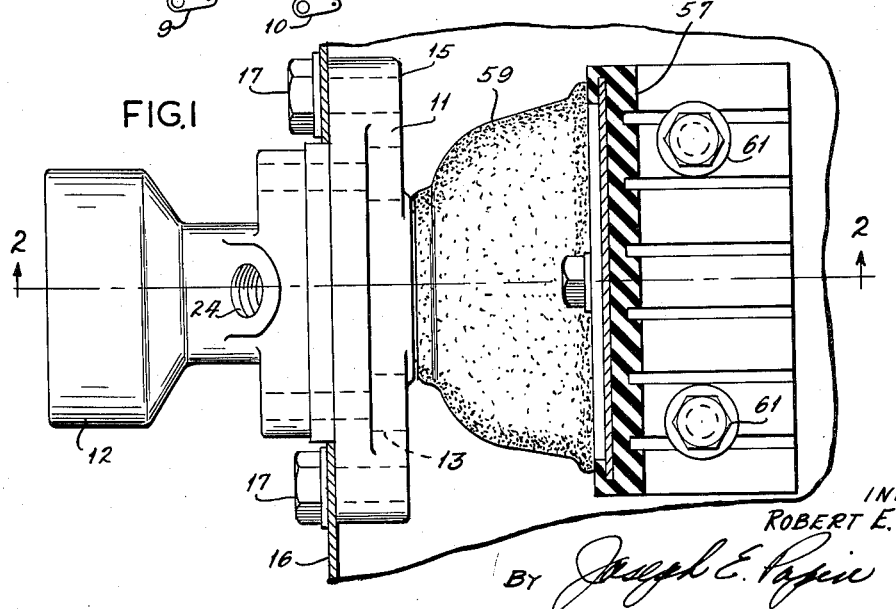
INVENTOR:
ROBERT E. SCHWARTZ
BY Joseph E. Papin

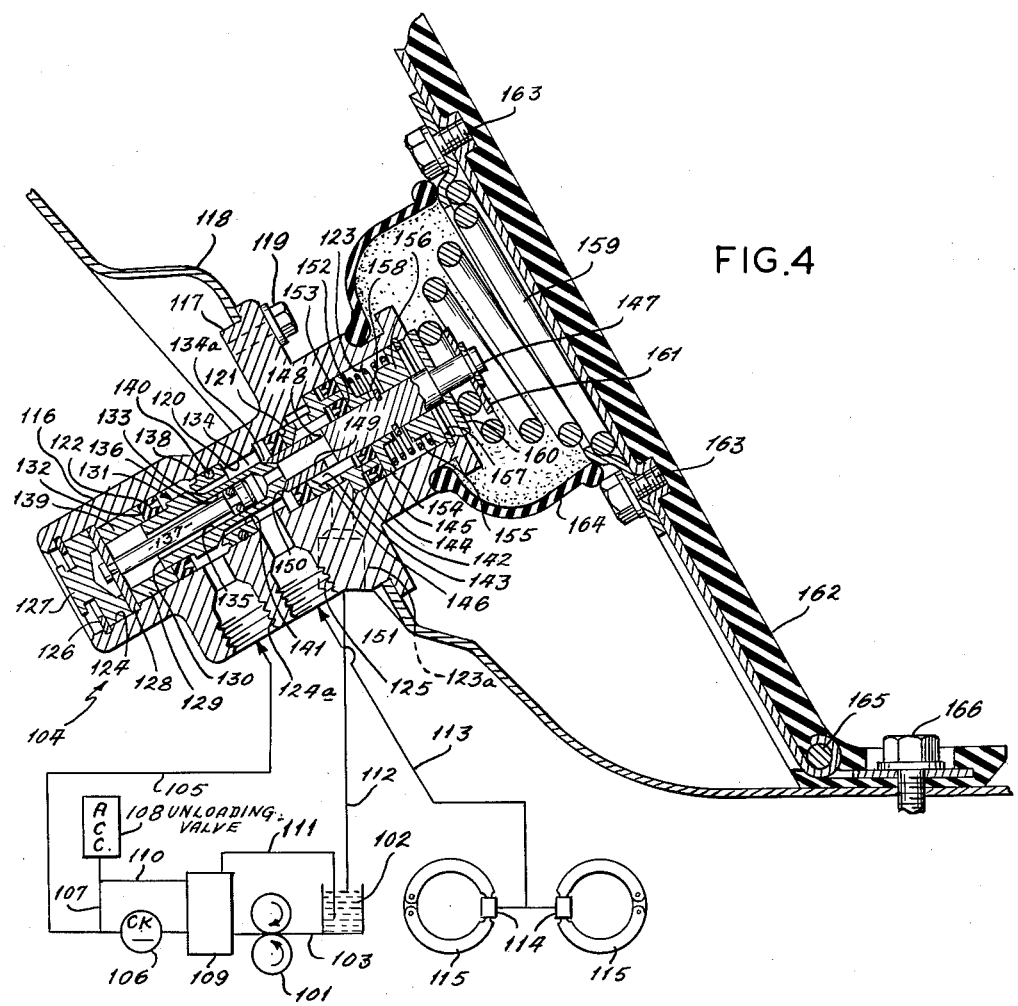

United States Patent Office 3,031,235
Patented Apr. 24, 1962

3,031,235
APPLICATION VALVE
Robert E. Schwartz, Clayton, Mo., assignor to Wagner Electric Corporation, St. Louis, Mo., a corporation of Delaware
Continuation of abandoned application Ser. No. 759,340, Sept. 5, 1958. This application May 22, 1961, Ser. No. 111,713
6 Claims. (Cl. 303—54)

This invention relates to brake systems and in particular to an application valve for controlling said systems.

One of the principal objects of the present invention is to provide an application valve having dual reaction means for transmitting the reaction force to the operator.

Another object of the present invention is to provide an application valve having operator controlled dual reaction means which also serve as valve means for controlling the intensity of the established fluid pressure in said application valve.

Another object of the present invention is to provide an application valve wherein a reaction spring also functions as a push rod.

Another object of the present invention is to provide an application valve of reduced length.

Still another object of the present invention is to provide an application valve having better brake "feel" and control.

Still another object is to provide an application valve which is easily assembled and economically manufactured.

These and other objects and advantages will become apparent hereinafter.

Briefly, the invention embodies application valve means having dual reaction means operable to control valve means therein, said dual reaction means being adapted to initially transmit only a portion of a reactionary force directly to the operator through reaction spring means and to subsequently transmit the entire reactionary force when said force exceeds a predetermined amount.

The invention also consists in the parts and in the arrangements and combination of parts hereinafter described and claimed. In the accompanying drawings which form a part of this specification and wherein like numerals and like symbols refer to like parts wherever they occur:

FIG. 1 is an elevational view showing the present application valve and the actuating pedal therefor partially in cross-section, FIG. 2 is a diagrammatic view of a brake system showing the present application valve therein in cross-section which was taken along line 2—2 of FIG. 1, FIG. 3 is a graph showing pedal force plotted against spring deflection, and FIG. 4 is a diagrammatic view of a brake system showing a modified application valve therein in cross-section.

This is a continuation of copending application, Serial No. 759,340 filed September 5, 1958, now abandoned, for Application Valve.

Referring now to FIGS. 1 and 2 in detail, the brake system comprises pressure producing means in the form of a compressor 1 connected to the inlet port of an application valve 2 by a conduit 3 having a supply tank or reservoir 4 interposed therein. The outlet port of the application valve 2 is connected by conduits 5 and 6 to power cylinders 7 and 8, which actuate wheel brake assemblies (not shown) through linkages or slack adjusters 9 and 10.

The application valve 2 comprises upper and lower housings 11 and 12 fixedly connected by suitable means, such as studs 13, with a resilient diaphragm 14 sealably interposed between said housings; said housing 11 having an integral mounting flange 15 fixedly attached to a vehicle toe-board 16 by suitable means, such as studs 17. The upper housing 11 is also provided with a bore 18 and an aligned counterbore 19, and the lower housing 12 is provided with a counterbore 20 and an aligned stepped bore 21, said counterbores 19 and 20 being substantially radially coextensive. The counterbores 19 and 20 are separated from each other by the reaction diaphragm 14 which is sealably interposed therebetween. The stepped bore 21 is also axially aligned with an intermediate bore 22 and a counterbore 23. An angularly disposed inlet port 24 which receives the conduit 3, as previously mentioned, intersects the intermediate bore 22 adjacent the juncture of said intermediate bore 22 and the stepped bore 21. An angularly disposed outlet port 25, which receives the conduit 5, as previously mentioned, intersects the counterbore 20 adjacent the juncture of said counterbore and the stepped bore 21.

A filter unit 26 is positioned in the counterbore 23 to muffle exhaust noise and to prevent the entry of foreign materials, said unit being retained therein by a snap ring 27 positioned in a suitable groove in said counterbore. Another snap ring 28 is positioned in a suitable groove in the intermediate bore 22 and retains a perforated spring retainer 29 against displacement therefrom. The spring retainer 29 seats an annular guide member 30 which slidably receives a tubular stem portion 31 of an inlet valve 32. A sealing cup 33 is seated on the guide member 30 and is sealably interposed between the wall of the intermediate bore 22 and the stem 31. The stem 31 has a sealing head 34 on the upper end thereof, and the inlet valve 32 is provided with an axial bore 35 and counterbore 36 therethrough. One end of a tubular exhaust valve stem 37 is fixedly positioned in the inlet valve bore 35 and the other end thereof extends axially therefrom through the stepped bore 21 into the counterbore 20 terminating in an exhaust valve seat 38. The seat 38 circumscribes a bore 39 which extends axially through the stem 37 and which is aligned with the inlet valve counterbore 36 to form an exhaust passage 40. A plurality of integral fingers 41 are provided adjacent the upper or free end of the exhaust valve stem 37 and extend radially into slidable engagement with the stepped bore 21 serving as guides for said stem and providing pressure fluid passages 42 thereby.

The inlet valve sealing head 34 is normally biased into sealable engagement with a seal carrying, floating valve seat member 43 by the relatively light compressive force of a spring 44 interposed between the spring retainer 29 and the shoulder formed at the juncture of the inlet valve bore 35 and counterbore 36. The seating member 43 is provided with a bore 45 which is coaxial with the exhaust valve stem 37, said seating member being normally positioned in abutment with the shoulder in the stepped bore 21 for sealable engagement with the sealing head 34. The light compressive force of the spring 44 not only seats the inlet valve 34 and positions the seating member 43 but also serves to bias the exhaust valve seat 38 into engagement with the diaphragm 14. In addition, the diameters of the inlet valve stem 31, the bore 45 of the seating member 43, and the exhaust valve seat 38 are equal so that the inlet valve 32 is balanced in either a seated or unseated position.

A secondary reaction piston 46 having an axial bore 47 and a peripheral flange 48 is slidably received in the upper housing counterbore 19. The secondary piston 46 is normally biased by the compressive force of a spring 50 into abutment with the diaphragm 14, and when so biased, the flange 48 abuts a stop member 49 positioned in a suitable groove adjacent the lower end of the counterbore 19. A primary reaction piston 51 having an enlarged hub portion 52 and stepped extension 53 is slidably received in the bore 47 of the secondary piston 46, said hub portion being adapted to abut with the secondary piston 46 upon limited relative movement therebetween. The primary piston 51 is normally biased into engagement with the diaphragm 14 opposite the exhaust valve seat 38 by the weight of its associated parts. The extension 53 of the primary piston 51 is slidably positioned in the upper housing bore 18 and extends externally therefrom to receive a tapered reaction spring 54. The smallest coil of the reaction spring 54 is mounted on the primary piston 51 between a washer 55 and a retainer 56 carried on the extension 53, and the largest coil of said reaction spring is fastened to the mid-portion of a brake treadle 57 by a plurality of screw and retainer assemblies 58. A resilient boot 59 is interposed between a groove in the upper housing 11 and the assemblies 58 to prevent the entry of foreign particles. The brake treadle 57 is pivoted at 60 and is fixedly attached to the toe-board 16 by suitable means, such as nut and bolt assemblies 61.

As shown in FIG. 3, the deflection of the reaction spring 54 is plotted against the applied treadle force resulting in a curve A having an ever increasing rate of change ($dF/dD$). This rate of change is substantially constant from an applied treadle force of 0 to 50 pounds, or approximately two-thirds of the total spring deflection. Thereafter, the rate of change increases rapidly and relatively small increases in spring deflection are accompanied by relatively large increases in the applied treadle force. This non-linear relationship between the applied treadle force and spring deflection promotes better brake feel and control. In other words, when the force is small, the travel is relatively large and controllable; and, when the force is large and controllable, the travel control is no longer needed.

In the operation, pressure fluid is normally discharged from the pressure producing means or compressor 1 to the inlet 24 of the application valve 2 through the conduit 3 and the supply tank or reservoir 4. With the treadle 57 in a released position, the component parts of the application valve 2 are in the positions shown in FIG. 2, that is, the inlet valve 32 is sealably engaged with the seating member 43, and the exhaust passage 40 is closed. Only the weight of the primary reaction piston 51 and parts associated therewith engage the diaphragm 14 on the exhaust valve seat 38, but this engagement is not sufficient to prevent the exhaust of an appreciable pressure from power cylinders 7 and 8.

If the operator desires to effect deceleration and/or a complete stop, an operator applied force on the treadle 57 is transmitted directly to the reaction spring 54 and to the primary reaction piston 51 causing said piston to further engage the diaphragm 14 with the exhaust valve seat 38 disrupting communication between the power cylinders 7 and 8 and the atmosphere. Further downward movement of the reaction spring 54 and primary reaction piston 51 compresses the spring 44 and unseats the inlet valve 32 from the seating member 43 thereby allowing pressure fluid to flow through the bore 45 of the seating member 43, the passages 42 of the exhaust valve fingers 41 in the stepped bore 21, the counterbore 20, and into the outlet port 25, conduits 5 and 6, and power cylinders 7 and 8 to actuate the wheel brake assemblies (not shown) and effect vehicle braking. Initially, the established fluid pressure in the counterbore 20 acts on the relatively small effective area of the primary reaction piston 51 through the diaphragm 14 creating a reactionary force in opposition to the operator applied force. The primary reaction piston 51 transmits a proportional amount of the total output force needed to bring the brake shoes (not shown) into contact with the brake drums (not shown) to the operator through the spring 54 and treadle 57. Simultaneously, the reaction pressure is also applied to the secondary reaction piston 46, and when the established fluid pressure acting on the effective area of the secondary reaction piston 46 through the diaphragm 14 exceeds a predetermined amount, said secondary piston moves against the compressive force of the spring 50 into abutment with the hub portion 52 of the primary piston 51 thereby creating an additive reactionary force in opposition to the operator applied force. Movement of the piston 46 into engagement with the piston 51 is dependent on the effective area of the piston 46 and also on the strength of the spring 50. With the primary and secondary reaction pistons in abutment, a proportional amount of the total output force of the braking application is transmitted to the operator in order to afford an appraisal or "feel" as to the extent of said braking application. In this manner, the operator applied force or treadle force is made substantially directly proportional to the total output force of the braking application which is the ultimate entity being controlled. The reaction force plus the negligible compressive force of the spring 44 opposes the operator applied force causing the compression of the reaction spring 54, said compression continuing until the reaction force equals the operator applied force. The balancing of these opposing forces will result in the valve seat 38 being moved into a "lapped" or poised position with the diaphragm 14 and the inlet valve 32 being momentarily moved into a "lapped" position with the seating member 43. Since the areas of the inlet valve 32 and exhaust valve extension 37 are balanced, said valve and extension will remain in the aforementioned "lapped" position whereby the exhaust passage 40 is closed to the outlet port 25 and the outlet port 25 is closed to the inlet port 24.

Should there be a leakage of fluid pressure from the brake system on the outlet side of the application valve, the reaction force and the operator applied force are unbalanced. However, since the areas of the inlet valve 32 and exhaust valve seat 38 are balanced, the aforementioned fluid pressure loss is automatically compensated for, and said exhaust valve seat and inlet valve are returned to a "lapped" position without further action by the operator. If the operator elects to increase the intensity of the braking application, the operator applied force is increased and transmitted directly through the reaction spring 54 to the primary and secondary pistons 46 and 51 to again unseat the inlet valve 32 until the desired braking effort has been attained, as previously described.

When the operator desires to release the brakes, the applied force is removed from the treadle 57 and reaction spring 54 which allows the established fluid pressure in the counterbore 20 to move the primary reaction piston 51 upwardly so that the inlet valve sealably re-engages the seating member 43. Upon movement of the primary reaction piston 51, the established fluid pressure in the power cylinders 7 and 8, and the counterbore 20 further moves the primary piston 51 upwardly and disengages the diaphragm from the seat 38, and the established fluid pressure is exhausted through the exhaust passage 40, the perforated retainer 29, and the filter 26 to the atmosphere. The compressive force of spring 50 returns the secondary reaction piston 46 to its original position as is the primary reaction piston 51 by the weight of the parts associated therewith.

Among the obvious advantages of the present invention are the ease of assembly and the simplicity of manufacture. The application valve 2 is also provided with the feature of self-aligning component parts which is most conducive to maintenance and repair. It should also be noted that the primary and secondary reaction pistons 51 and 46 are assembled with reference only to the upper housing bore 18 and counterbore 19 and that the stem 37 and inlet valve 32 are assembled with reference only to the smaller portion of the stepped bore 21 and the intermediate bore 22.

From the foregoing, it is apparent that the present application valve 2 is provided with dual reaction means for transmitting the reaction force to the operator. The primary reaction piston 51 is responsive to an operator applied force to unseat the inlet valve 32 to establish fluid pressure communication between the inlet port 24 and outlet port 25. The established fluid pressure acts on the effective area of the primary reaction piston 51 through the diaphragm 14 to create a reaction force in opposition to the operator applied force. In this manner, a proportional amount of the total output force needed to engage the brake shoes with the brake drums is transmitted to the operator. When the established fluid pressure exceeds a predetermined amount, an additional reaction force, created by the established fluid pressure acting on the effective area of the secondary reaction piston 46, moves said secondary reaction piston into abutment with the primary reaction piston 51 whereby said reaction forces are additive in opposition to the operator applied force. In this manner, a proportional amount of the total output force of the braking application is transmitted to the operator to afford an appraisal or "feel" as to the extent of the braking application. As a result, the operator applied force is made substantially proportional to the total output force of the braking application which is the ultimate entity being controlled.

It is apparent that the operator controlled reaction means of the present application valve also serves as valve means for controlling the intensity of the established fluid pressure. The reaction means, that is the primary and secondary pistons 51 and 46 and the diaphragm 14, normally co-operate with the inlet valve 32 to close the exhaust passage 40 therethrough, and the primary reaction piston 51 is responsive to an operator applied force to unseat the inlet valve 32 to establish fluid pressure communication between the inlet port 24 and outlet port 25.

One of the principal advantages of the present invention is that the reaction spring 54 also serves as a push rod. Instead of utilizing a conventional push rod and spring cage assembly between the reaction means and the foot treadle, the instant reaction spring 54 has one end connected to the primary reaction piston 51 while the other end thereof is connected to the treadle 57. The tapered reaction spring 54 is not only simple to install and to fasten but also obviates the close tolerances required for a conventional push rod.

Another advantage is that the length of the application valve 2 is reduced appreciably. By employing the reaction spring 54 between the reaction piston 51 and the treadle 57, the conventional push rod is obviated which consequently permits a reduction in length of the valve housing 11, conserving weight and space, both of which are at a premium in modern vehicles.

Another advantage of the present invention is that the application valve 2 is provided with better "feel" and brake control. As well known in the art, "feel" and brake control are directly related to pedal force and pedal travel, and to have the same comfortable degree of control at all rates of deceleration, the pedal travel should be pronounced at low pedal forces and diminished at high pedal forces. From the graph shown in FIG. 3, it is shown that the application valve 2 affords larger pedal travel necessary to attain a high degree of control at lower pedal forces or lower rates of deceleration. It is also shown that the application valve 2 affords smaller pedal travel where less control by travel is necessary to attain a higher degree of control, namely at higher pedal forces or higher rates of deceleration. As a result, the control is by force-feel and less by travel-feel.

Referring now to FIG. 4, a braking system is shown comprising pressure producing means 101 having the suction side thereof connected to a reservoir 102 by a conduit 103 and the pressure side thereof connected to the inlet port of a modified application valve 104 by a conduit 105. A check valve 106 is interposed in the conduit 105 for uni-directional flow purposes, and a conduit 107 connects an accumulator 108 with the conduit 105 between said check valve and the inlet port of the application valve 104. An unloading valve 109 is interposed in the conduit 105 on the other side of the check valve 106 to control pressure producing means 101. The unloading valve 109 is also connected to the conduit 107 by a control conduit 110 interposed therebetween and to the reservoir 102 by a by-pass conduit 111. To complete the braking system, the exhaust port of the application valve 104 is connected to the reservoir 102 by a conduit 112, and another conduit 113 has one end connected with the outlet port of said application valve while the other end thereof branches to connect with wheel cylinders 114 of wheel brake assemblies 115.

The application valve 104 comprises a housing 116 having an integral mounting flange 117 which is fixedly attached to the vehicle toe-board 118 by suitable means, such as studs 119. The housing 116 is provided with a bore 120 and stepped bores 121 and 122 which are aligned with and interposed between upper and lower counterbores 123 and 124. Exhaust and inlet ports 123a and 124a intersect the larger portions of the stepped bores 121 and 122, respectively, and receive the conduits 112 and 105, as previously mentioned. The outlet or working port 125 intersects the bore 120 and receives the conduit 113, as previously mentioned.

A snap ring 126 in a suitable groove adjacent the lower end of the counterbore 124 positions a seal carrying, closure member 127 against displacement, and a valve guide retainer 128 is positioned between said closure member and the shoulder formed by the stepped bore 122 and counterbore 124. The retainer 128 serves as a seat for a spacer 129 which has a bore 130 therethrough, and said bore slidably receives the lower end of an inlet valve 131. A sealing cup 132 is seated against the spacer 129 and is sealably interposed between the wall of the stepped bore 122 and the inlet valve 131. The mid-portion of the inlet valve 131 is provided with a rounded sealing surface 133 and has an integral extension 134 protruding axially therefrom. The extension 134 also has a rounded sealing surface 134a on the free end portion thereof. The inlet valve 131 has an axial passage 135 therethrough, and a plurality of ports 136 are provided adjacent the junction of the sealing surface 133 and extension 134 to allow pressure fluid access to the valve passage 135. The upper end of the valve passage 135 is closed by a seal carrying guide 137 which is slidable in said passage and also fixedly attached to the valve guide retainer 128. The valve sealing surface 133 is normally biased into sealable engagement with a floating valve seat member 138 by the relatively light compressive force of a spring 139 which is interposed between the lower end of the inlet valve 131 and the guide retainer 128.

The seat member 138 carries a seal 140 interposed between the periphery thereof and the wall of the stepped bore 122, and the member 138 has a bore 141 which is coaxial with the valve extension 134, the lower end thereof being beveled or rounded for cooperating engagement with the valve surface 133. Fluid pressure in the bore 122 will therefore urge the seating member 138 into abutting engagement with the shoulder formed between the bore 120 and the stepped bore 122; and the valve 131 will then sealably engage the seating member 138.

A secondary reaction piston 142 is slidably positioned in the counterbore 123 and extends into the stepped bore 121. The secondary piston 142 is provided with a bore 143 and a counterbore or recess 144, and the upper end thereof has an outside groove 145 therearound. A cross-bore 146 extends through the secondary piston 142 and intersects the bore 143 registering with the exhaust port 123a. A primary reaction piston 147 is slidably positioned in the secondary piston bore 143 and has a cross-bore 148 which registers with the cross-bore 146. The primary piston 147 also has an axial exhaust passage 149 which has one end intersecting the cross-bore 148 and the other end thereof terminates in a beveled or rounded surface forming an exhaust valve seat 150 for sealable engagement with the inlet valve extension sealing surface 134a.

When the inlet valve 131 is engaged with the seat member 138, it is balanced since the effective area of the lower end of the inlet valve 131 is equal to the effective area of the sealing surface 133. Furthermore, the effective area of the sealing surface 134a when engaged with the seat 150 is equal to and balanced by the effective area of the sealing surface of the valve guide 137. Therefore, regardless of the inlet pressure or the outlet pressure, valve 131 remains in balance, and there are no forces acting in an opening or closing direction on the inlet valve except the negligible light compressive force of the spring 139.

A sealing cup 151 is sealably interposed between the periphery of the primary piston 147 and the wall of the stepped bore 121 being seated by the lower end of the secondary piston 142. Another sealing cup 152 is sealably interposed between the periphery of the primary piston 147 and the wall of the recess 144, and still another sealing cup 153 is sealably interposed between the wall of the counterbore 123 and groove 145. The cups 152 and 153 are seated by an annular retainer 154 which is slidably interposed between the primary piston 147 and the wall of the counterbore 123, and the retainer 154 is biased into abutment with the secondary piston 142 by the compressive force of the spring 155. The spring 155 is interposed between the retainer 154 and a closure member 156 which slidably receives the primary piston 147 and is retained in the counterbore 123 against displacement by a snap ring 157. The primary piston 147 also carries a snap ring 158 in spaced relationship with the retainer 154 which is adapted for abutment therewith upon limited relative movement between the primary and secondary pistons 147 and 142.

The primary reaction piston 147 protrudes externally of the counterbore 123 to receive a tapered reaction spring 159. The smaller coil of the reaction spring 159 is positioned between a washer 160 carried by the primary piston 147 and a retainer assembly 161 spaced therefrom and carried adjacent the end of said primary piston. The larger coil of the reaction spring 159 is positioned in abutment with the mid-portion of a brake treadle 162 and is fastened thereto by a plurality of screw and retainer assemblies 163. A resilient boot 164 is interposed between the housing 116 and the assemblies 163 to prevent the entry of foreign particles. The brake treadle 162 is pivoted at 165 and fixedly attached to the toe-board 118 by suitable means, such as studs 166.

In the operation with the treadle 162 in released position, the component parts of the application valve 104 are in the positions shown; that is, the inlet valve 131 is sealably engaged with the seating member 138 by the compressive force of the spring 139, and the extension 134 is lightly sealably poised on the primary piston seat 150 by weight of the pedal 162 and parts associated therewith. Under the above conditions, pressure fluid normally flows from the reservoir 102 via the conduit 103 to the pressure producing means 101 being discharged therefrom to the inlet port 124a of the application valve 104 through the conduit 105 and the check and unloading valves 106 and 109, respectively. This pressure fluid is also normally distributed to develop an accumulated volume of fluid pressure in the accumulator 108 through the conduit 107. The fluid pressure existing in the accumulator 108 is also transmitted to the unloading valve 109 by the conduit 110. The establishment of a predetermined maximum fluid pressure in the accumulator 108 actuates the unloading valve 109 to by-pass the pressure fluid eminating from pressure producing means 101 through the by-pass conduit 111 and back to the reservoir 102. If the fluid pressure in the accumulator 108 should decrease below a predetermined minimum due to system leaks and/or braking applications, the unloading valve 109 will again function to close the by-pass conduit 111 and permit the pressure producing means 101 to again discharge pressure fluid to the accumulator 108 and application valve 104. In this manner, pressure producing means 101 is controlled by the unloading valve 109 which in turn is actuated by the fluid pressure fluctuations of the accumulator 108. The check valve 106 prevent reverse flow in the conduit 105.

If the operator desires to effect deceleration and/or a complete stop, a manually applied force on the treadle 162 is transmitted directly to the reaction spring 159 and primary reaction piston 147 causing the exhaust valve seat 150 to sealably engage the inlet valve extension sealing surface 134a thereby disrupting communication between the wheel brake assemblies 115 and the atmosphere. Further downward movement of the reaction spring 159 and primary piston 147 overcomes the negligible compressive force of the spring 139 and unseats the inlet valve 131 from the seat member 138 thereby allowing pressure fluid to flow from the inlet port 124a and stepped bore 122 through the seat bore 141, the bore 120 and outlet port 125 into the conduit 113 to actuate the wheel cylinders 114 of wheel brake assemblies 115 and effect vehicle braking. Initially, the fluid pressure acts on the effective area of the primary piston 147 creating a reactionary force in opposition to the applied force, said reactionary force being the proportional amount of the total output force needed to bring the brake shoes of wheel brake assemblies 115 into contact with the brake drum (not shown). As the fluid pressure increases in the bore 120, the fluid pressure on the effective area of the secondary piston 142 moves said piston upwardly against the compressive force of the spring 155 into engagement with the abutment 158 carried by the primary piston 147 creating an additive reactionary force in opposition to the applied force. With the primary and secondary pistons 147 and 142 engaged, a proportional amount of the total output force of the braking application is transmitted to afford the operator an appraisal or "feel" of the extent of said braking application. In this manner, the treadle force is substantially directly proportional to the total output retarding force which is the ultimate entity being controlled. The force of spring 155 accounts mainly for the force to engage the shoes and drums; this force is transmitted to the valve body and not to the foot. The reactionary forces plus the negligible compressive force of the spring 139 oppose the operator applied force causing compression of the reaction spring 159, said compression continuing until the reactionary forces equal the operator applied force. This balancing of forces will result in the inlet valve sealing surface 133 being moved into a "lapped" or poised position with the seat member 138 and the exhaust valve seat 150 being moved into a "lapped" position with the inlet valve sealing surface 134a. Since the areas of the inlet valve 131 are designed to be in balance, said inlet valve will remain in the aforementioned "lapped" position whereby the exhaust port 123a is closed to the outlet port 125 and said outlet port 125 is closed to the inlet port 124a.

Should there be a lowering of fluid pressure in the brake system on the outlet side of the application valve, there would be an equal loss of fluid pressure in the stepped bore 120. This results in an unbalancing of the reactionary and applied forces; however, since the inlet valve 131 and exhaust valve seat 150 are balanced, the abovementioned fluid pressure loss is automatically compensated for, and said exhaust valve and inlet valve are returned to a "lapped" position without further action by the operator. If the operator elects to increase the intensity of the braking application, an increased applied force is transmitted directly to the reaction spring 159 and pistons 142 and 147 unbalancing the forces and overcoming the compressive force of the spring 139 until the desired braking effort has been attained, as hereinbefore described.

When the operator desires to release the brakes, the applied force is removed from the treadle 162 and reaction spring 159 allowing the compressive force of the spring 139 to reseat the inlet valve sealing surface 133; and, the fluid pressure in the bore 120 unseats the exhaust valve seat 150. In this manner, the pressure fluid is exhausted through the exhaust passage 149, the cross-passage 148 of the primary piston 147, and the cross-bore 146 of the secondary piston 142 into the bore 121 and therefrom via the exhaust port 123 and conduit 112 back into the reservoir 102. Upon exhaust of the pressure fluid, as abovementioned, the compressive force of the spring 155 returns the secondary piston 142 to its original position, and the weight of the various parts connected to the primary piston 147 returns said primary piston to its original position.

Thus it is apparent that there has been shown and described herein an application valve which fulfills all of the objects and advantages sought therefor. It is apparent however, that many changes, alterations and modifications of the present valve could be made by those skilled in the art. All such changes, alterations and modifications which do not depart from the spirit and scope of this invention are deemed to be covered by the invention which is limited only by the claims which follow.

What is claimed is:

1. An application valve comprising a housing having inlet, outlet, and exhaust ports, valve means controlling fluid pressure communication between said ports, operator controlled reaction means including relatively movable primary and secondary reaction means positioned in said housing for operative engagement with said valve means, said primary reaction means being movable independently of said secondary reaction means in response to an applied force into engagement with said valve means to move said valve means to a position interrupting fluid pressure communication between said outlet and exhaust ports and establishing fluid pressure communication between said inlet and outlet ports, said primary reaction means being movable independently of said secondary reaction means in response to a relatively low established fluid pressure at said outlet port to transmit a reaction force in opposition to the applied force, and resilient means normally biasing said secondary reaction means in a direction to prevent the transmission of a reaction force by said secondary reaction means in response to the relatively low established fluid pressure, said secondary reaction means being movable independently of said primary reaction means and against the biasing force of said resilient means in response to a relatively higher established fluid pressure at said outlet port into abutment with said primary reaction means to coact with said primary reaction means and increase the transmitted reaction force.

2. An application valve comprising a housing having inlet and outlet chambers, valve means normally interrupting fluid pressure communication between said chambers, an exhaust passage in said valve means normally venting said outlet chamber to atmosphere, primary reaction means in said outlet chamber and operatively engageable with said valve means, operator controlled means for applying a force to said primary reaction means, said primary reaction means being responsive to the applied force to engage said valve means to close said exhaust passage interrupting fluid pressure communication between said outlet chamber and the atmosphere and move said valve means to establish fluid pressure communication between said inlet and outlet chambers, said primary reaction means being responsive to relatively low established fluid pressure in said outlet chamber to transmit a reaction force in opposition to the force applied by said operator controlled means, secondary reaction means in said outlet chamber movable independently of said primary reaction means and movable in response to a relatively higher established fluid pressure into abutment with said primary reaction means to increase the reaction force in opposition to the force applied by said operator controlled means, and resilient means engaged with said secondary reaction means for absorbing the reaction force transmitted by said secondary reaction means in response to the relatively low established fluid pressure in said outlet chamber prior to the engagement of said primary and secondary reaction means.

3. An application valve comprising a housing having inlet, and outlet ports, valve means normally interrupting fluid pressure communication between said inlet and outlet ports, an exhaust passage in said valve means normally venting said outlet port to the atmosphere, a pair of concentric relatively movable piston means mounted in said housing, diaphragm means sealably secured in said housing and positioned between said valve means and said pair of piston means, one of said piston means being movable in response to an applied force to sealably engage said diaphragm means with said valve means to close said exhaust passage interrupting fluid pressure communication between said outlet port and atmosphere and to move said valve means to a position establishing fluid pressure communication between said inlet and outlet ports, said one piston means being responsive to relatively low established fluid pressure acting on said diaphragm means to transmit a reaction force in opposition to the applied force, the other of said piston means being movable into engagement with said one piston means in response to relatively higher established fluid pressure acting on said diaphragm means to increase the transmitted reaction force in opposition to the applied force, and resilient means between said other piston means and housing for transmitting the reaction force of said other piston means to said housing prior to the engagement of said piston means.

4. An application valve comprising a housing having actuation and reaction chambers therein, inlet, outlet, and exhaust ports in said actuation chamber, valve means in said actuation chamber normally interrupting fluid pressure communication between said inlet and outlet ports, an exhaust passage in said valve means normally communicating said outlet and exhaust ports, a resilient diaphragm mounted between said chambers and adjacent said valve means, relatively movable primary and secondary piston means mounted in said reaction chamber, said piston means normally biasing said diaphragm into engagement with said valve means to close said exhaust passage, operator controlled actuating means connected with said primary piston means externally of said housing, said primary piston means being movable in response to an operator applied force on said actuating means to move the valve means to a position establishing fluid pressure communication between said inlet and outlet ports, said primary piston means being responsive to relatively low established fluid pressure to transmit a reaction force in opposition to said operator applied force, said secondary piston means being movable in response to higher established fluid pressure to coact with said primary piston means and increase the transmitted reaction force.

5. An application valve comprising a housing having a bore with a resilient diaphragm mounted therein, said diaphragm defining actuation and reaction chambers adjacent opposite sides thereof, spaced inlet and outlet ports in said actuation chamber, a first valve seat in said actuation chamber intermediate said inlet and outlet ports, valve means normally biased into engagement with said first valve seat to interrupt fluid pressure communication between said inlet and outlet ports, said valve means having an integral extension, an axial exhaust passage extending through said valve means and extension for communicating said outlet port with the atmosphere, a second valve seat on the end portion of said extension in circumscribing relationship with the corresponding end portion of said exhaust passage, a secondary piston slidably received in said actuating chamber and having an axial bore therethrough, a primary piston slidably received in the bore of said secondary piston, spaced abutment surfaces on said pistons to limit relative movement therebetween, said pistons normally biasing said diaphragm into engagement with said second valve seat to close said exhaust passage, a reaction spring having one end connected with said primary piston externally of said housing and the other end connected with an operator operated treadle member, said primary piston means being movable in response to an operator applied force on said treadle member and reaction spring to disengage said valve means from said first valve seat and establish fluid pressure communication between said inlet and outlet ports, said primary piston being responsive to the intensity of establishd fluid pressure to transmit a reaction force in opposition to said operator applied force, said secondary piston being movable into abutment with said primary piston in response to established fluid pressure above a predetermined amount, and spring means interposed between said secondary piston and the end wall of said actuation chamber to obviate movement of said secondary piston in response to established fluid pressure below said predetermined amount.

6. A control valve comprising a housing having inlet and outlet chambers therein, and inlet and outlet ports in said inlet and outlet chambers, respectively, a first valve seat in said inlet chamber and having passage means formed therethrough between said chambers, a bore in said housing connecting with said inlet chamber and aligned with said passage means, valve means including a sleeve portion slidable in said bore and extending into said inlet chamber, a sealing head on said sleeve portion normally engaged with said first valve seat to close said passage and interrupt fluid pressure communication between said ports, an extension on said sleeve portion extending through said passage means and having a free end in said outlet chamber, an exhaust passage extending axially through said sleeve portion and extension and normally venting said outlet port to the atmosphere, a second valve seat formed on the free end of said extension in circumscribed relation with said exhaust passage, primary reaction means in said outlet chamber, said primary reaction means being movable in response to an applied force to engage said second valve seat and close said exhaust passage interrupting communication between said outlet port and the atmosphere and being further movable to disengage said sealing head from said first valve seat and establish fluid pressure communication between said inlet and outlet ports, secondary reaction means in said outlet chamber movable relative to said primary reaction means, said primary reaction means being responsive to a relatively low established fluid pressure in said outlet chamber to transmit a reaction force in opposition to the applied force, and resilient means for preventing movement of said secondary reaction means in response to the relatively low established fluid pressure in said outlet chamber, said secondary means being movable against said resilient means into abutment with said primary means in response to a relatively higher established fluid pressure in said outlet chamber to increase the reaction force in opposition to the applied force.

References Cited in the file of this patent
UNITED STATES PATENTS

| | | |
|---|---|---|
| 2,410,966 | Eaton | Nov. 12, 1946 |
| 2,698,205 | Gagen | Dec. 28, 1954 |
| 2,854,289 | Schnell | Sept. 30, 1958 |